Figure 1:
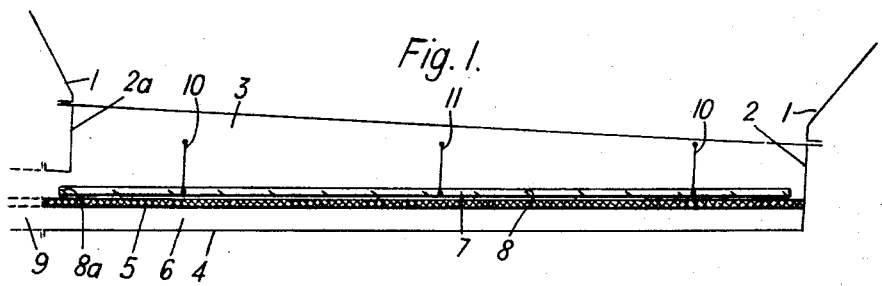

April 29, 1958 W. R. BARRETT 2,832,645
DISCHARGING AND CONVEYING OF GRANULAR MATERIALS
Filed July 31, 1956

Inventor
WILLIAM R. BARRETT
By
Watson, Cole, Grindle & Watson
Attorneys

United States Patent Office 2,832,645
Patented Apr. 29, 1958

2,832,645

DISCHARGING AND CONVEYING OF GRANULAR MATERIALS

William Reginald Barrett, Norton-on-Tees, England, assignor to Polysius Gesellschaft mit beschränkter Haftung, Neubeckum, Germany Application July 31, 1956, Serial No. 601,273

Claims priority, application Great Britain August 8, 1955

7 Claims. (Cl. 302—29)

The present invention relates to the discharging of granular materials from bins or hoppers through inclined chutes and to their conveying in inclined troughs of the type in which a gas is passed through a permeable base or floor to fluidise the material.

Chutes and troughs of the above-mentioned type have been successfully applied to the discharging and conveying of granular materials which are substantially of equidimensional form but experience has shown that they are not successful with material of other forms, for example needle shaped crystals, which tend to form heaps in the chutes and troughs which cannot be broken up by the gas flow through the permeable base.

This difficulty however may be satisfactorily overcome by the apparatus of the present invention.

According to the present invention in inclined chutes and troughs of the type in which a gas is passed through a permeable base or floor to fluidise the material and to cause it to flow thereon, the feature of providing suspended elements adapted to execute oscillatory motion along the chute or trough to agitate the layer of material in the chute or trough.

The suspended elements may take various forms. For example, they may be plates, of outline substantially that of the cross-section of the chute or trough above the permeable base, which are pivotally suspended across the chute or trough from the sides at points adjacent to the top edge of the plates and are spaced along the chute or trough at desired intervals, the pivots or spindles from which the plates are suspended being on at least one side passed through the side of the chute or trough so that an oscillatory motion may be applied by suitable means. It has been found desirable however, particularly when elements of the above-described form are applied to a hopper or bin discharge chute, to connect two or more of them by suitably pivoted links within the chute or trough and to apply the oscillatory motion to one element only, the motion then being transmitted to the other or others by the linkage so that they oscillate in unison. With the above-described arrangement within a hopper or bin discharge chute it has also been found advantageous to arrange the links connecting the plate elements to be at varying distances from the axes of suspension so that the angular displacement of the plates counting from the innermost one, progressively increases towards the outlet end of the chute.

For use in straight conveying troughs having an inclination of the order of three degrees to the horizontal a convenient form of element comprises a frame, which is substantially of width equal to that of the trough, and which is suitably suspended by pivoted hangers from the sides of the trough and across which are arranged members of suitable cross-section which are spaced apart lengthwise of the frame to form a grid-like structure. It will be understood that two or more of such frames with grid-like structures may be linked together and adapted to execute oscillatory motion in the desired manner. For example, the frames may be suspended from pivoted hangers of different lengths in order to obtain progressive angular movement as above-mentioned.

The members forming the grid-like structures may take various forms. For example, they may be round bars or tubes, flat or bent plates. Round bars or tubes have been found particularly suitable when handling materials of a nature that tend to agglomerate into substantially compact lumps, for example, needle or similar shaped crystals. On the other hand, it has been found equally suitable when handling a material composed largely of fines having some tendency to agglomerate to use flat plate members which are arranged in the fashion of louvre blades inclined in the direction of the flow of the material. Preferably when handling a finely crystalline material the flat plate members are inclined upwards in the direction of the flow of the material.

The desired oscillatory motion of the elements may be applied in any known manner, to the pivots or spindles from which they are suspended, for example by suitably arranged crank and slotted lever mechanisms. Since however, the gas used for fluidising the materials in the chute and troughs is generally air from a compressed air supply it may be convenient to use double-acting air cylinders to apply the desired oscillatory motion to the elements.

Some preferred forms of the suspended elements of the present invention are illustrated diagrammatically in the following description by reference to the accompanying drawing.

Figure 2:
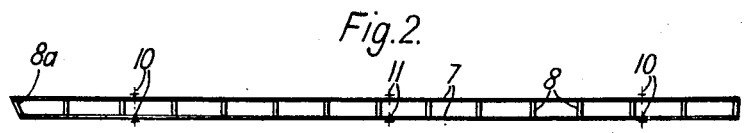

In the drawing Figure 1 is a longitudinal section through the discharge chute of a storage hopper and Figure 2 is a plan view of the suspended element shown in Figure 1.

Figure 3:
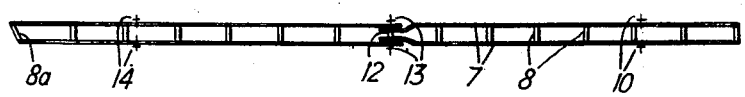
Figure 4:
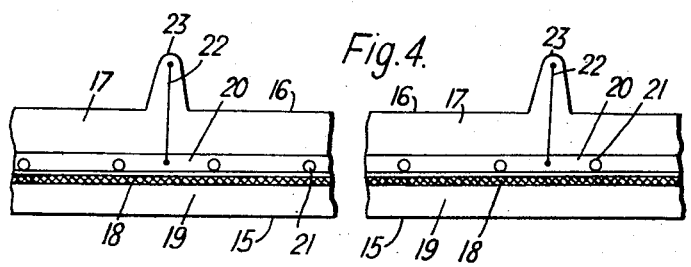

Figure 3 is an alternative form of the element shown in Figures 1 and 2 and Figure 4 illustrates the application of a suspended element to a shallow conveying trough.

Referring to Figures 1 and 2 of the drawing the numeral 1 indicates the outlet of the storage hopper and the numerals 2, 2a, 3 and 4 the ends, sides and bottom respectively of the discharge chute, which is provided with a floor of permeable tiles 5, to define a space 6, to which compressed air is supplied to pass through the permeable tiles 5 to fluidise the material above them.

The suspended element to agitate the material in the chute comprises a frame of flat bar side members 7 having flat plate cross members 8, suitably attached thereto, for example by welding, to form the structure shown in plan view in Figure 2, the cross members 8 being inclined upwards in the direction of the flow of the material, i. e. from right to left of the drawing. The end cross member designated by 8a is arranged on the chute to assist the flow of the material around a bend (not shown) in the conveying trough which is connected to the hopper chute at 9.

The element is pivotally suspended by the hangers 10 and 11 which are mounted at their upper ends on spindles arranged in suitable housings in the sides 3 of the hopper chute, the hangers 10 being freely mounted to rotate on their spindles but the hangers 11 are securely mounted on their spindle which is arranged to pass to the outside of the hopper chute at one side and the outside portion is provided with a lever adapted to cooperate with a double-acting compressed air cylinder by which the desired oscillation of the element is effected.

In the alternative form of the element illustrated in Figure 3, which is a plan view, the element is constructed and suspended in a similar manner to that above-described by reference to Figures 1 and 2, but is in two portions pivotally linked together at 12 with the hangers 13 shorter than the hangers 10 and the hangers 14 shorter than those designated 13 so that the angular displacement of hangers 10 is less and that of hangers 14 is greater than the angular displacement of hangers 13.

Referring now to Figure 4 of the drawing, which is a broken longitudinal section, the conveying trough comprises the bottom plates 15, the top covers 16, side plates 17, and a floor of permeable tiles 18 defining the space 19 for the fluidising compressed air.

The suspended element 20 for agitating the layer of material above the permeable tiles is substantially of similar arrangement to that already described by reference to Figures 1 and 2 of the drawing, but has cross-members 21 of round tube. In order to accommodate the length of the pivoted hangers 22 required in this shallow trough to give the desired amplitude of oscillation to the suspended element raised enclosures 23 are arranged in the top covers of the conveying trough.

I claim:

1. The combination with an elongated, inclined trough having a porous false bottom through which air is introduced to fluidize material in the trough of a grid-like member arranged in said trough slightly spaced above said false bottom and extending across substantially the full width and along the length of the trough, said member having elongated sides and cross-pieces extending between the sides at intervals along their length, means supporting said member for swinging movement in the direction of the length of the trough, and means for imparting swinging movement to the trough.

2. The combination as in claim 1 wherein said cross-pieces are in the form of bars.

3. The combination as in claim 2 wherein the length of the pairs of links progressively decreases from one end of the trough to the other whereby the vertical component of the swinging movement of the trough progressively increases from said one end to the other.

4. The combination as in claim 2 wherein the height of the side walls of the trough above the false bottom is substantially less than the length of the links and upwardly extending projections are provided on said side walls at points corresponding to the location of the links for pivotally receiving the ends of the links.

5. The combination as in claim 1 wherein said cross-pieces are in the form of louvers inclined from bottom to top in the direction of travel of the material in the trough.

6. The combination as in claim 1 wherein the extreme forward cross-piece at the discharge end of the trough is arranged at an angle oblique to the longitudinal axis of the trough.

7. The combination as in claim 1 wherein said supporting means comprises a plurality of links arranged in pairs along the length of the member, which links are pivotally connected at one end to the sides of the member and at the other to the side walls of the trough.

References Cited in the file of this patent

UNITED STATES PATENTS

| | | |
|---|---|---|
| 2,220,193 | Ahlmann | Nov. 5, 1940 |

FOREIGN PATENTS

| | | |
|---|---|---|
| 729,178 | Germany | Nov. 12, 1942 |
| 712,593 | Great Britain | July 28, 1954 |